(12) United States Patent
Lundbäck et al.

(10) Patent No.: US 6,480,492 B1
(45) Date of Patent: Nov. 12, 2002

(54) ESTABLISHING INTERNAL CONTROL PATHS IN ATM NODE

(75) Inventors: Arne Lundbäck, Skogås (SE); Göran Hansson, Årsta (SE); Torgny Lindberg, Tullinge (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/249,785

(22) Filed: Feb. 16, 1999

(51) Int. Cl.[7] ............................................. H04L 12/56
(52) U.S. Cl. ............................. 370/395.1; 370/395.3; 370/396; 370/398
(58) Field of Search .......................... 370/230, 235, 370/236, 255, 328, 329, 352, 355, 359, 392, 395.1, 396, 397–398, 395.3, 395.31, 400, 401, 409, 902, 905

(56) References Cited

U.S. PATENT DOCUMENTS

| | | | |
|---|---|---|---|
| 5,568,479 A | | 10/1996 | Watanabe et al. |
| 5,680,390 A | | 10/1997 | Robrock, II |
| 5,724,348 A | * | 3/1998 | Basso et al. ................. 370/384 |
| 5,740,156 A | | 4/1998 | Tanabe et al. |
| 6,091,731 A | * | 7/2000 | Biegaj et al. ............... 370/218 |
| 6,097,726 A | * | 8/2000 | Puntambekar et al. ...... 370/397 |
| 6,101,190 A | * | 8/2000 | Song .......................... 370/411 |
| 6,240,090 B1 | * | 5/2001 | Enhager ................... 370/241.1 |
| 6,262,985 B1 | * | 7/2001 | Huang et al. ............... 370/397 |
| 6,289,019 B1 | * | 9/2001 | Dieudonne ............... 370/395.3 |
| 6,304,571 B1 | * | 10/2001 | Watanabe .................. 370/398 |
| 6,385,167 B1 | * | 5/2002 | Kamo ........................ 370/228 |
| 6,396,811 B1 | * | 5/2002 | Petersen .................... 370/250 |

* cited by examiner

Primary Examiner—Hassan Kizou
Assistant Examiner—Ahmed Elallam
(74) Attorney, Agent, or Firm—Nixon & Vanderhye, P.C.

(57) ABSTRACT

To form internal control paths in an ATM node (20, 120), "half trails" (HF) are initially established and subsequently connected to form complete trails (FT). In an ATM node having plural node entities (30, 130) or device boards connected to a switch core (24, 124), for each node entity a main control path program (70) executed by a node main processor () initially forms both a listening half trail and a sending half trail extending from the node main processor and switch core. Separately and independently, i.e., without prior communication with the node main processor, an entity control path program (80) executed by an entity processor (50, 150) at each node entity establishes a listening half trail between itself and the switch core. For each node entity, the entity control path program establishes the same VPI/VCI as the listening half trail. The entity processor then receives on its independently established listening half trail (i.e., on the predetermined VPI/VCI) a handshaking request. The handshaking request (HR) includes information indicating what half trail (e.g., what other VPI/VCI) the node entity can use as a sending half trail for sending control cells to node main processor. The node entity then responds to the handshaking request with a response message (RM) sent over the sending half trail. Single stage and multi-stage ATM node embodiments are provided. The entity control path program (80) is preferably the same for each node entity.

45 Claims, 12 Drawing Sheets

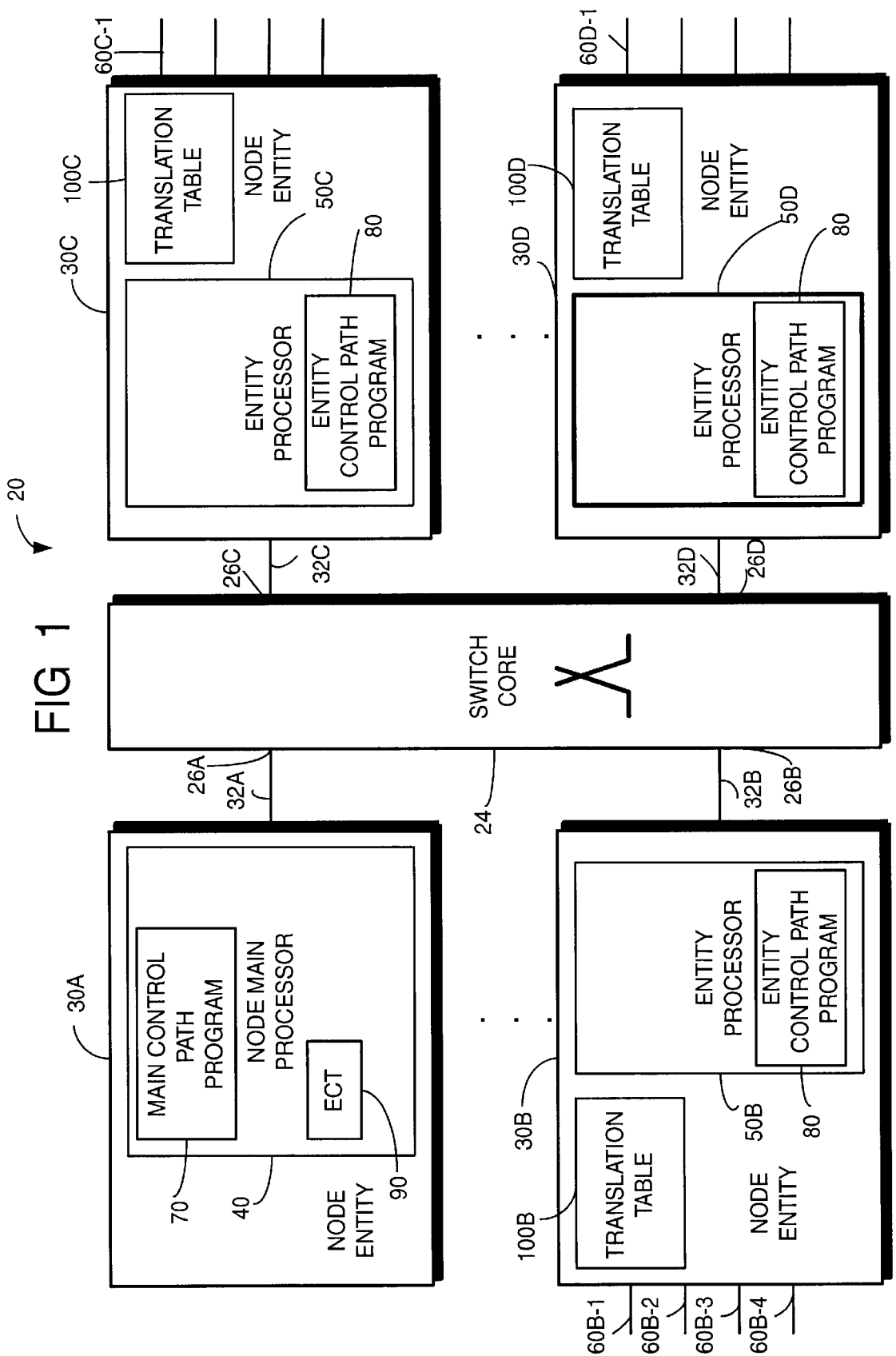

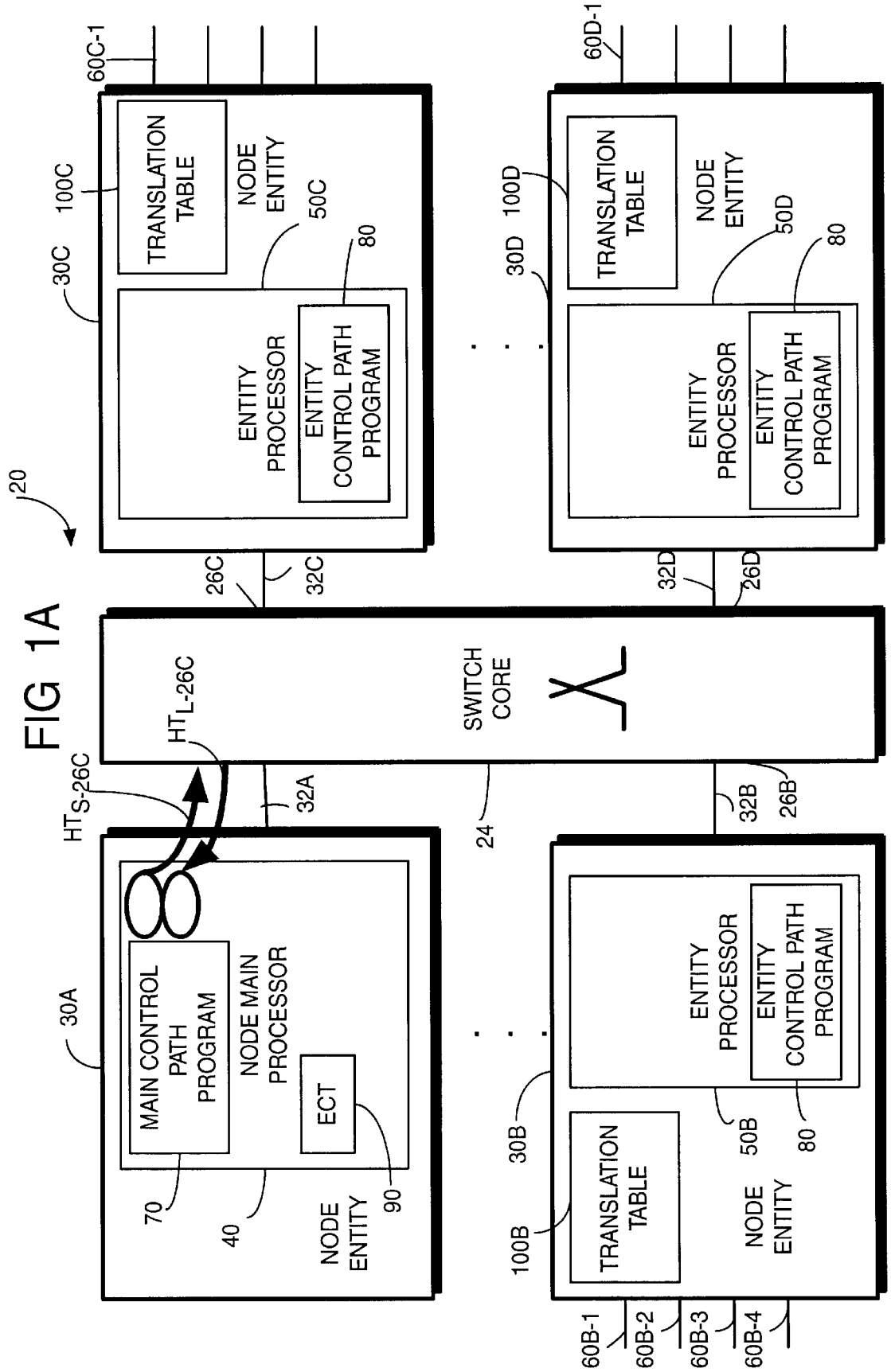

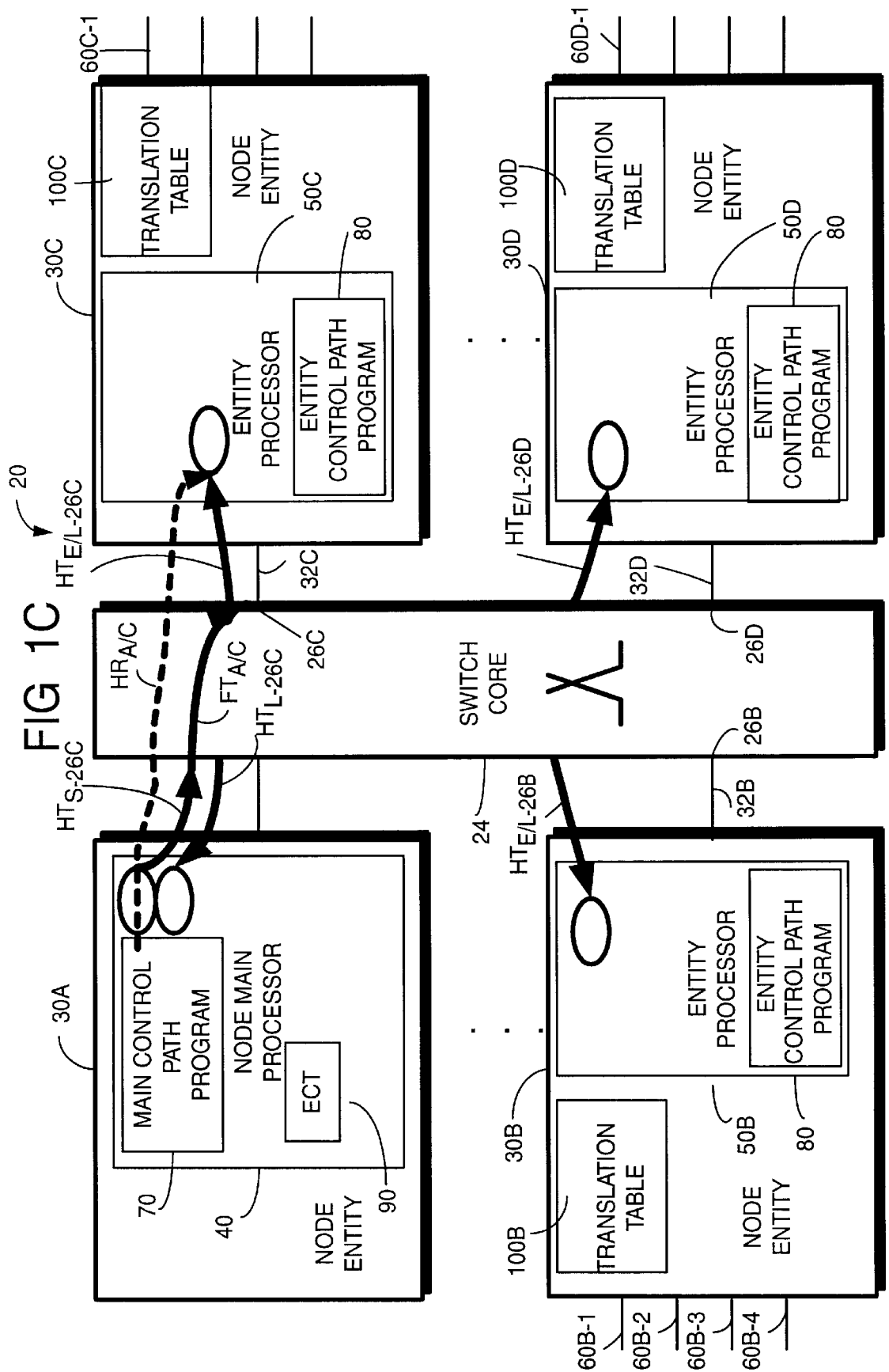

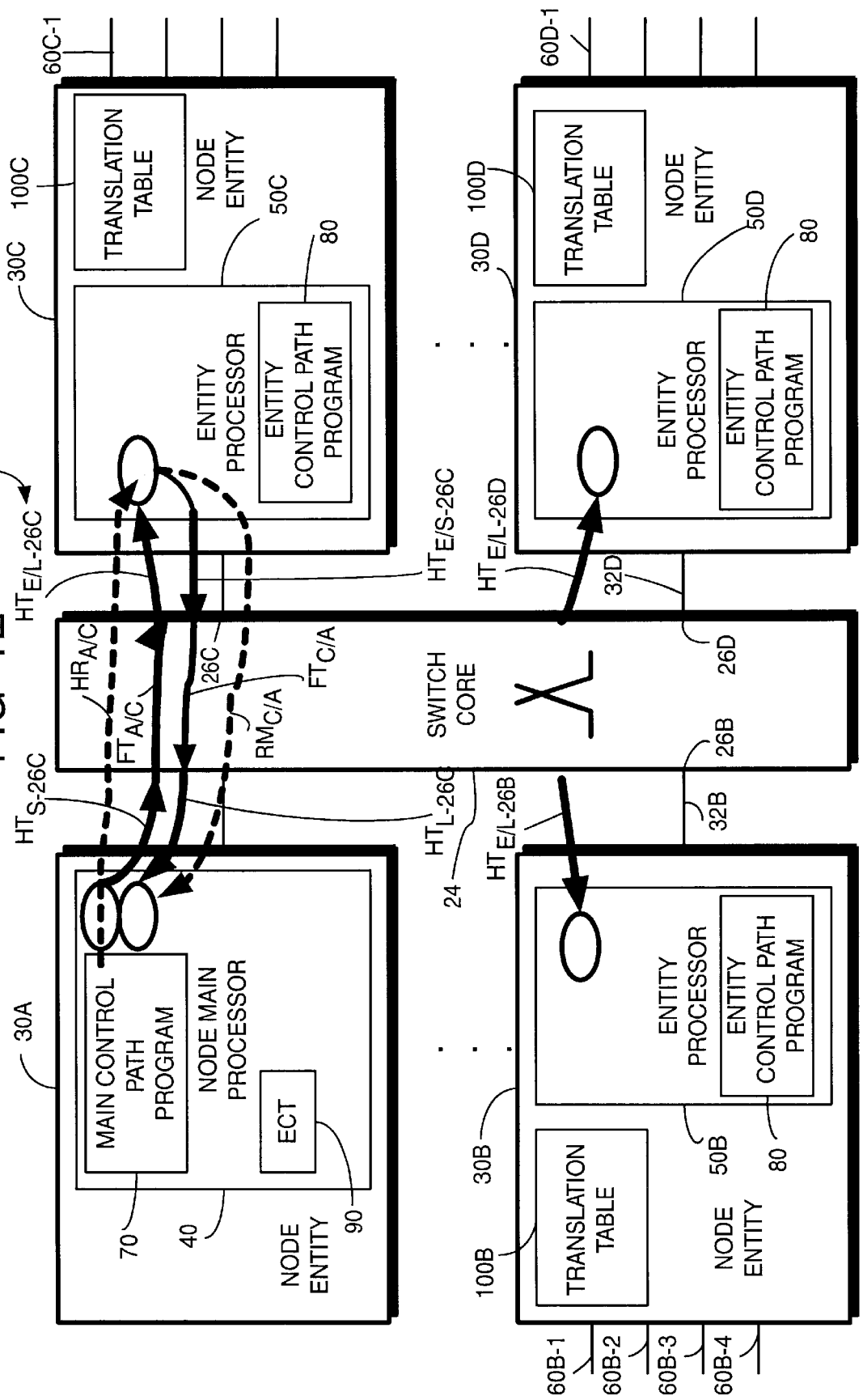

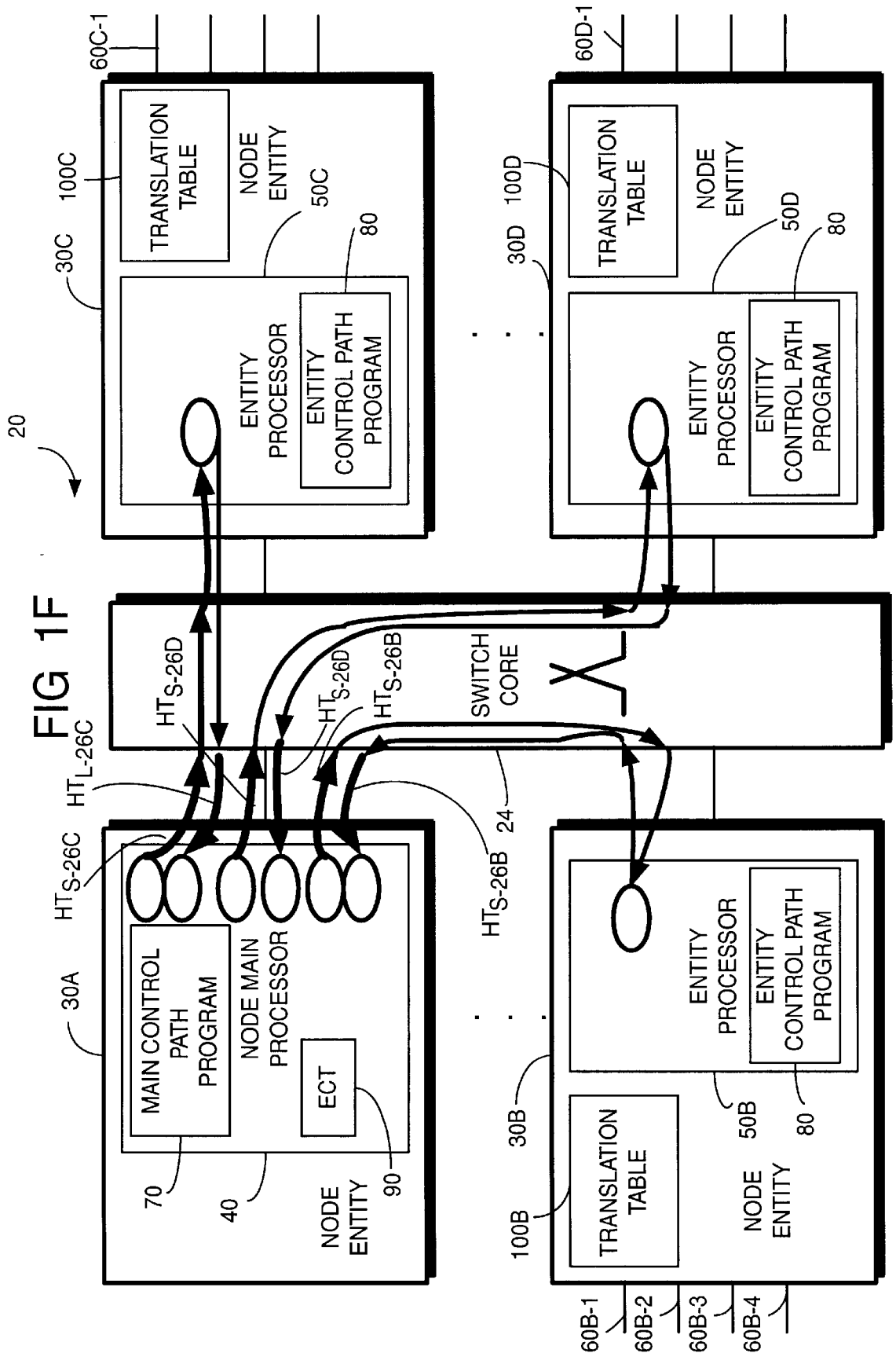

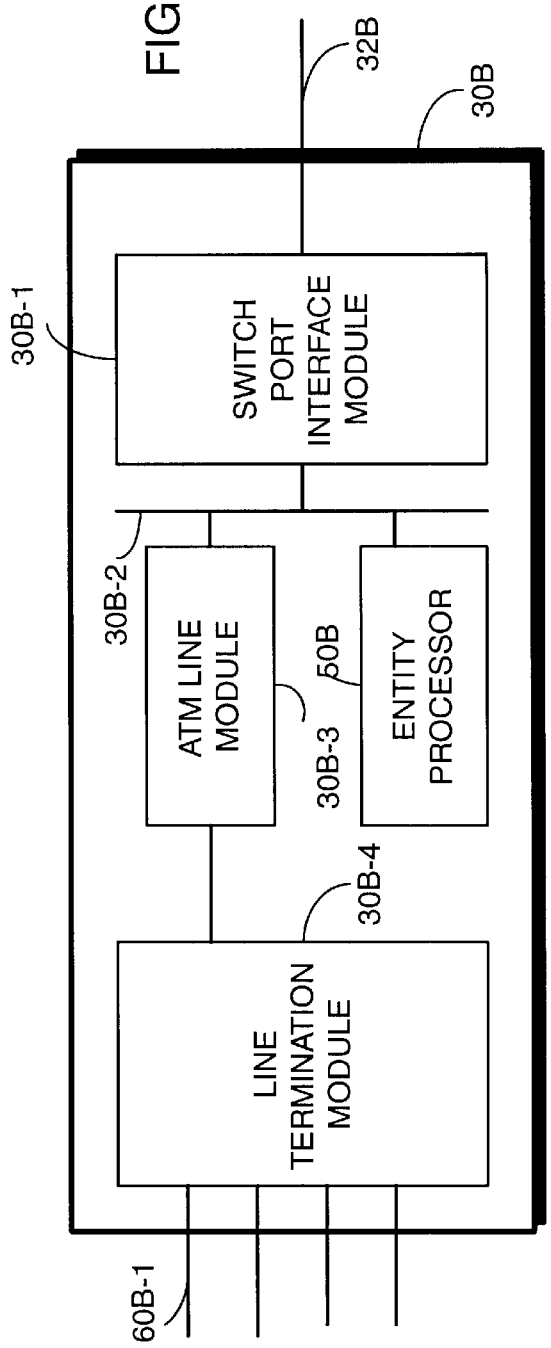
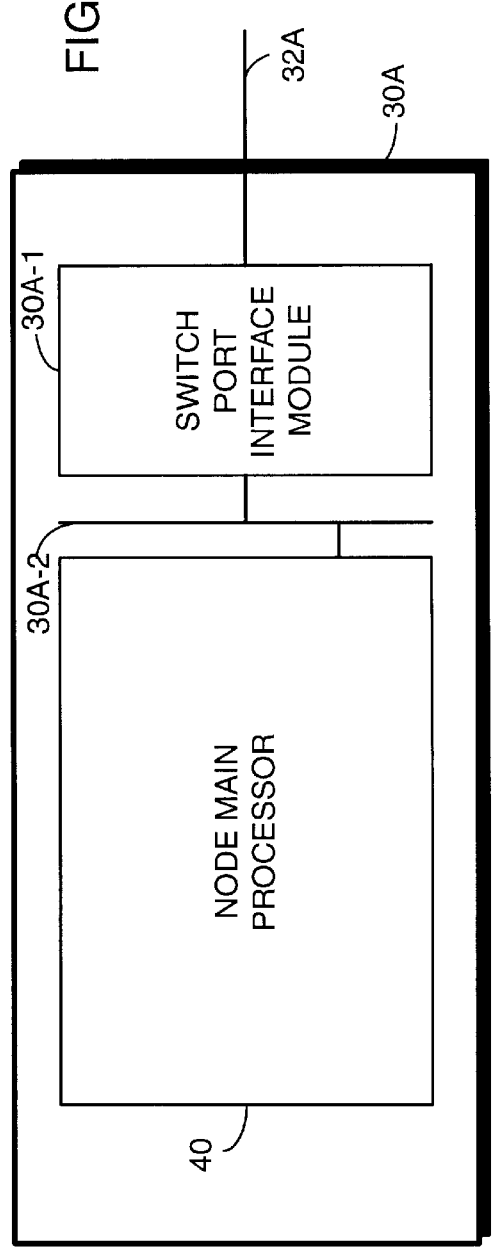

FIG 6

| INGRESS DIRECTION | | | EGRESS DIRECTION | |
|---|---|---|---|---|
| VPI/VCI LINK SIDE | VPI/VCI SWITCH SIDE | SAI-ADDRESS | VPI/VCI LINK SIDE | VPI/VCI SWITCH SIDE |
| 0/100 | 1/0 | (1,0) | 0/100 | 0/1 |
| 0/101 | 1/0 | (2,0) | 0/101 | 0/2 |
| 0/102 | 1/0 | (3,0) | 0/102 | 0/3 |

— # ESTABLISHING INTERNAL CONTROL PATHS IN ATM NODE

BACKGROUND

1. Field of the Invention

The present invention pertains to the Asynchronous Transfer Mode (ATM), and particularly to establishing internal control paths in an ATM node.

2. Related Art and Other Considerations

The increasing interest for high band services such as multimedia applications, video on demand, video telephone, and teleconferencing has motivated development of the Broadband Integrated Service Digital Network (B-ISDN). B-ISDN is based on a technology know as Asynchronous Transfer Mode (ATM), and offers considerable extension of telecommunications capabilities.

ATM is a packet-oriented transfer mode which uses asynchronous time division multiplexing techniques. Packets are called cells and traditionally have a fixed size. A traditional ATM cell comprises 53 octets, five of which form a header and forty eight of which constitute a "payload" or information portion of the cell. The header of the ATM cell includes two quantities which are used to identify a connection in an ATM network over which the cell is to travel, particularly the VPI (Virtual Path Identifier) and VCI (Virtual Channel Identifier). In general, the virtual is a principal path defined between two switching nodes of the network; the virtual channel is one specific connection on the respective principal path.

At its termination points, an ATM network is connected to terminal equipment, e.g., ATM network users. Typically between ATM network termination points there are plural switching nodes, the switching nodes having ports which are connected together by physical transmission paths or links. Thus, in traveling from an originating terminal equipment to a destination terminal equipment, ATM cells forming a message may travel through several switching nodes.

A switching node has a plurality of ports, each of which can be connected by via a link circuit and a link to another node. The link circuit performs packaging of the cells according to the particular protocol in use on the link. A cell incoming to a switching node may enter the switching node at a first port and exit from a second port via a link circuit onto a link connected to another node. Each link can carry cells for plural connections, a connection being e.g., a transmission between a calling subscriber or party and a called subscriber or party.

The switching nodes each typically have several functional parts, a primary of which is a switch core. The switch core essentially functions like a cross-connect between ports of the switch. Paths internal to the switch core are selectively controlled so that particular ports of the switch are connected together to allow a message ultimately to travel from an ingress side of the switch to an egress side of the switch, and ultimately from the originating terminal equipment to the destination terminal equipment.

The coordination and control of an ATM switching node is accomplished by transmitting control cells over internal control paths established between processors of the node. It is an object of the present invention to provide a simplified approach for establishing internal control paths for an ATM node.

BRIEF SUMMARY OF THE INVENTION

To form internal control paths in an ATM node, "half trails" are initially established and subsequently connected to form complete trails. In an ATM node having plural node entities or device boards connected to a switch core, for each node entity a main control path program executed by a node main processor initially forms both a listening half trail and a sending half trail extending from the node main processor and switch core. Separately and independently, i.e., without prior communication with the node main processor, an entity control path program executed by an entity processor at each node entity establishes a listening half trail between itself and the switch core. For each node entity, the entity control path program establishes the same VPI/VCI (e.g., a predetermined VPI/VCI) as the listening half trail. The entity processor then receives on its independently established listening half trail a handshaking request. The handshaking request includes information indicating what half trail (e.g., what other VPI/VCI) the node entity can use as a sending half trail for sending cells to node main processor. The node entity then responds to the handshaking request with a response message sent over the sending half trail.

The same entity control path program is preferably loaded into each node entity. The entity control path program uses the same VPI/VCI to open a listening half trail at each node entity. The listening half trail can thus be set up without previous program interaction with the main control path program executed at the node main processor.

In one embodiment wherein the ATM node is a single stage node with a sole switch core, the half trails emanating from the node main processor are known as core-open half trails because they have one end terminated at the node main processor and another end open at the switch core of the node. In the single stage node embodiment, the handshaking request also includes an address of the node main processor on one of the node entities.

In another embodiment the ATM node is a multi-stage or cascaded node having plural switch cores, with each stage of the node having a node entity which serves as an extension terminal. A physical link connects the extension terminals of the two stages. The extension terminal of the second stage includes a VPI/VCI translation table and a traffic device. In the multi-stage node embodiment, the half trails emanating from the node main processor are known as interface-open half trails because they have a second end open to the physical link which connects the two stages of the node. In the multi-stage node embodiment, the handshaking request includes an address of the traffic device of a second stage switch which is to be used to forward cells to the node main processor.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1 is a schematic view of an ATM node according to an embodiment of the invention.

FIG. 1A–FIG. 1F are schematic views of the ATM node of FIG. 1 showing basic steps involved in establishing control paths between a node main processor and node entities.

FIG. 2A is a schematic view of an node entity which includes a node main processor.

FIG. 2B is a schematic view of an node entity which serves as an extension terminal.

FIG. 6 is a diagrammatic view of a VPI/VCI translation table at an extension terminal which bridges two stages of the ATM node of FIG. 5.

DETAILED DESCRIPTION OF THE DRAWINGS

Figure 1B:
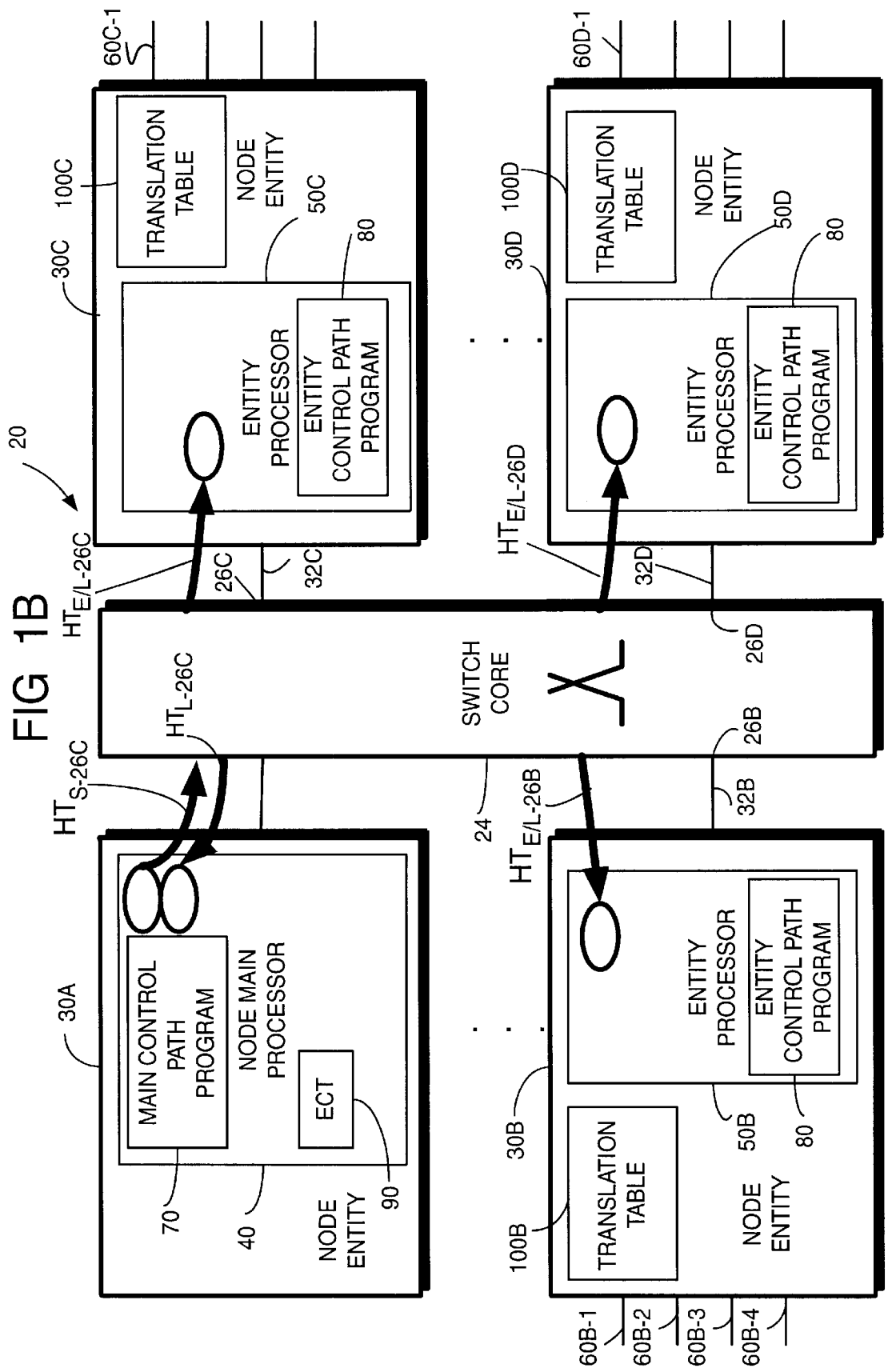

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

FIG. 1 shows an Asynchronous Transfer Mode (ATM) node 20 according to a first embodiment of the invention. ATM node 20 comprises a switch core 24 which has plural switch core ports, four of the switch core ports being shown as switch core ports 26A–26D in FIG. 1. A node entity 30, also known as a device board, is connected to each of the switch core ports. FIG. 1 shows node entity 30A being connected by a bidirectional link 32A to switch core port 26A; node entity 30B being connected by another bidirectional link 32B to switch core port 26B; and so forth. It should be understood that more than four node entities 30 can be, and typically are, connected to corresponding ports 26 of switch core 24, but that only four node entities 30 are shown for sake of simplification.

Each node entity 30 performs one or more functions and has, among other components hereinafter described, a processor mounted thereon. One of the node entities 30, particularly node entity 30A, has node main processor which generally supervises operation of the entire ATM node 20. The other node entities 30, such as node entities 30B–30D, have entity processors 50B–50D, respectively, also known as board processors.

In the particular embodiment shown in FIG. 1, each of node entities 30B–30D are serve as extension terminals. Having such function, the node entities 30B–30D are connected by physical lines or links to other ATM nodes. For example, node entity 30B is shown as having four physical lines 60B-1 through 60B-4 to other (unillustrated) ATM node(s). Although not necessarily labeled, in FIG. 1, the other node entities 30B and 30C also have four physical lines extending to other (unillustrated) ATM node(s).

In general, the ATM node 20 serves to route ATM traffic cells between physical lines 60 which connect ATM node 20 to other ATM nodes. For example, ATM traffic cells incoming to ATM node 20 on physical line 60B-1 can be routed by switch core 24 to be outgoing from ATM node 20 on physical line 60C-1. The entity processor of each node entity 30 plays a significant role when establishing ATM connections to/from that entity. In case of an extension terminal (ET) entity, the establishing of an ATM connection between a physical line and another node entity (e.g., another extension terminal or any other type of node entity) is performed by setting up a translation table row (hosted in the ATM line module), one for each direction. In the ingress direction, the translation assigns an internal VPI/VCI and an addressee switch port for each utilized VPI/VCI on the physical link. The addressee switch port is used to route each cell to the right switch port (i.e., node entity). In the egress direction, the translation assigns the VPI/VCI to be used on the physical link for each VPI/VCI used internally between two node entities. When actually transmitting cells on the connection, only hardware is involved (e.g., no processors perform any tasks concerning cell transfer). In the case of any other type of node entity (e.g., an entity that terminates an ATM connection), the principles discussed above apply except for the egress direction in which no external VPI/VCI is assigned. Instead, a termination point (software entity of the processor) is utilized.

As mentioned above, the overall operation of ATM node 20 is managed by node main processor 40. In order to communicate with the node entities 30, and particularly with the entity processors 50 of the respective node entities 30, certain control paths must be established between node main processor 40 and the entity processors 50 so that the processors can communicate with one another. The communication is performed by cells which are transmitted over the control paths established between node main processor 40 and the various entity processors 50. It is the establishment of these control paths which is an important aspect of the present invention.

Before discussing establishment of control paths, a more detailed discussion of the structure of node entities 30 is provided. In this regard, FIG. 2A shows an example node entity 30A at which node main processor 40 is situated. The node entity 30 of FIG. 2A includes a switch port interface module (SPIM) 30A-1 which is connected by bidirectional link 32A to switch core 24. The switch port interface module (SPIM) 30A-1 is connected to bus 30A-2, which is preferably a UTOPIA standard bus. The node main processor 40 is connected by bus 30A-2 to switch port interface module (SPIM) 30A-1.

FIG. 2B shows an example node entity 30 which serves as an extension terminal. Like FIG. 2A, the node entity 30 of FIG. 2B has switch port interface module (SPIM) 30B-1 and bus 30B-2, with a processor (entity processor 50) being connected to bus 30B-2. In addition, bus 30B-2 is connected to ATM line module 30B-3. The ATM line module 30B-3, as hereinafter explained, contains VPI/VCI translation tables used for performing the external/internal VPI/VCI and internal/external VPI/VCI translations described above. The ATM line module 30B-3 is, in turn, connected to line termination module (LTM) 30B-4. It is line termination module (LTM) 30B-4 which is connected to the physical lines 60.

Examples of the components of a node entity 30 are described for example, in the following United States Patent Applications (all of which are incorporated herein by reference): U.S. patent application Ser. No. 08/893,507 for "Augmentation of ATM Cell With Buffering Data" (abandoned); U.S. Pat. No. 6,154,459 for "Buffering of Point-to-Point and/or Point-to-Multipoint ATM Cells"; U.S. Pat. No. 6,034,958 for "VP/VC Look-Up Function"]; and, U.S. Provisional Application Ser. No. 60/086,619 for "Asynchronous Transfer Mode Switch."

Discussion now resumes with the focal issue of establishing control paths between node main processor 40 and the entity processors 50. As explained in more detail below, according to the present invention certain "half trails" are initially established and subsequently employed to form complete trails. As used herein, a "trail" is an end-to-end connection with terminations at both ends. A trail can be bidirectional or unidirectional. A trail utilizes a certain ATM connection, i.e., a certain VPI/VCI pair. The trail thus comprises the utilized connection together with the protocol terminations at its ends. A "half trail" is a connection with one terminated end and one open end. Two half trails using the same VPI/VCI constitute a trail if they have their open ends on the same physical medium, e.g., an ET link or the switch core.

In the above regard, for each anticipated node entity 30 a main control path program 70 executed by the node main processor 40 initially forms both a listening half trail and a sending half trail between node main processor 40 and switch core 24, one pair for each node entity. Separately and independently, i.e., without prior communication with node main processor 40, an entity control path program 80 executed by each entity processor 50 establishes a listening half trail between switch core 24 and the entity processor 50. For each node entity 30, the entity control path program 80 uses the same predetermined VPI/VCI for the listening half trail. The entity processor 50 can then receive on its independently established listening half trail (i.e., on the predetermined VPI/VCI) information indicating what half trail (e.g., what other VPI/VCI) the node entity 30 can use for sending control cells to node main processor 40.

Figure 3:
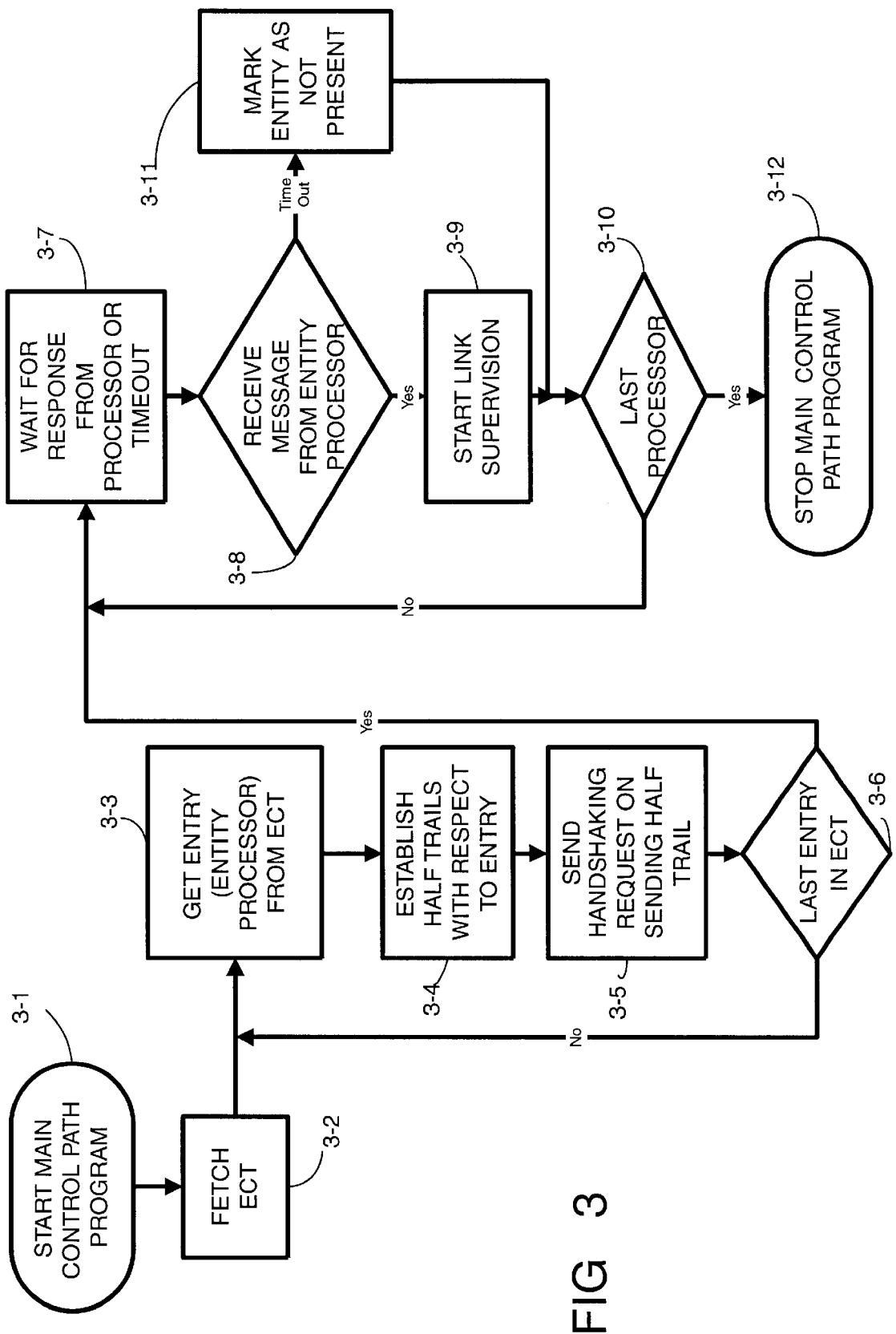
FIG. 3 is a flowchart showing basic steps involved in a control path establishment program executed by a node main processor of the node of FIG. 2A.
Figure 4:
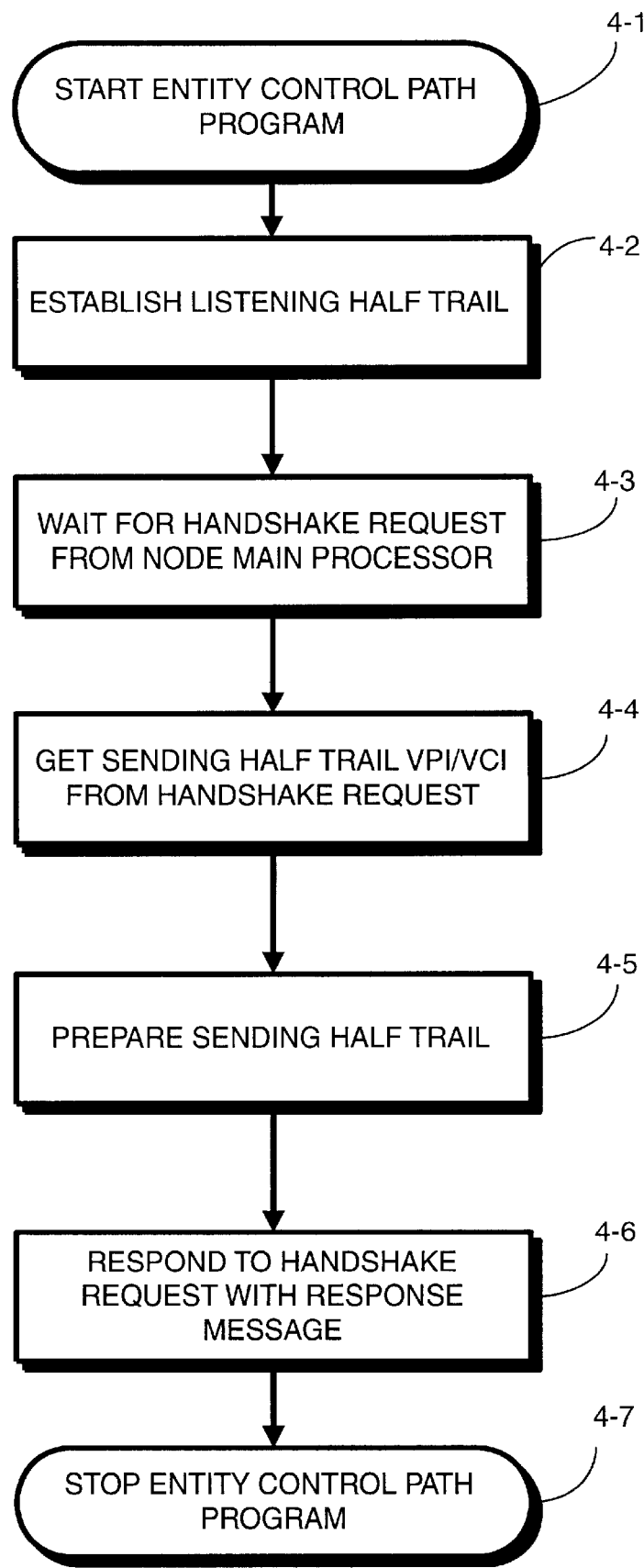
FIG. 4 is a flowchart showing basic steps involved in a uniform entity program executed by an entity processor of the node of FIG. 2B.

FIG. 3 shows basic steps involved in the execution of main control path program 70 by node main processor 40; FIG. 4 shows basic steps involved in the execution of entity control path program 80 by each of the entity processor 50 of node entities 30.

The main control path program 70 begins execution, i.e., starts up, at node main processor 40 as shown by step 3-1 in FIG. 3. Start up can be initiated in either of several ways, e.g., power-up, operator ordered restart, or spontaneous restart due to a hardware and/or software error. In the illustrated embodiment, all processors of ATM node 20 receive the same start up signal, so that start-up initiation will start execution of prommed software at all node entities 30. In other words, in each node entity 30 the entity processor 50 thereof starts up its associated entity control path program 80 as the main control path program 70 is being started at node main processor 40. Step 4-1 of FIG. 4 thus is indicative of start up of entity control path program 80 at each entity processor 50.

At step 3-2, main control path program 70 obtains a special table, known as the entity configuration table (ECT) 90. The entity configuration table (ECT) 90 is either created by an operator (e.g., upon initial execution of main control path program 70) or (upon subsequent executions) fetched from a hard disk of ATM node 20. The entity configuration table (ECT) 90 can be created using a normal text-editor and then stored in a file which can be transferred to the hard disk of ATM node 20 using normal file transfer mechanisms. It is assumed at this juncture that the node main processor 40 has accessed the entity configuration table (ECT) 90 and obtained the contents thereof.

An example entity configuration table (ECT) 90 is shown as Table 1. The entity configuration table (ECT) 90 has one row for each processor of ATM node 20. For each processor the entity configuration table (ECT) 90 specifies, e.g., a subrack identity and position within subrack (e.g., an indication to which of the plural switch core ports the node entity 30 of the processor is connected). As it turns out for the present example, for simplicity all node entities 30 are on the same subrack (i.e., subrack 1) and switch core ports 26B–26D are identified respectively for entity processors 50B-50D.

TABLE 1

ENTITY CONFIGURATION TABLE (ECT)

| Processor | Subrack Identity | Switch Core Port Connection |
| --- | --- | --- |
| 50B | 1 | 26B |
| 50C | 1 | 26C |
| 50D | 1 | 26D |

Step 3-3 through step 3-6 constitute a loop which is performed by main control path program 70 for each processor listed in entity configuration table (ECT) 90. For each processor, at step 3-3 the main control path program 70 obtains an entry (i.e., processor identification) from entity configuration table (ECT) 90, for which (at step 3-4) the main control path program 70 establishes two half trails. The first half trail is a sending half trail identified by a VPI/VCI and the switch port number of the addressed node entity. The second half trail is a listening or receiving half trail identified by a VPI/VCI.

FIG. 1A shows the establishment of half trails by main control path program 70 at step 3-4 for node entity 30C of ATM node 20. For purposes of illustration, the sending half trail is identified by a triplet which specifies the VPI, VCI used by the half trail and the switch core port of the addressed node entity. The listening receiving half trail is identified by a pair which specifies the VPI/VCI utilized by the half trail. For example, a sending half trail $HT_{S-26C}$ for node entity 30C has the triplet ($VPI_1$, $VCI_1$,26C) while a listening half trail $HT_{L-26C}$ has the pair ($VPI_2$,$VCI_2$). Each of the half trails HT have a termination at node main processor 40 (as indicated by an oval in FIG. 1A) and its open end at switch core 24. The half trails terminated at the node main processor 40 are, of course, physically realized over bidirectional link 32A.

Independently of action at node main processor 40 (other than essentially simultaneous start up), and without any prior communication with node main processor 40, at step 4-2 the entity control path program 80 of each node entity 30 establishes a listening half trail. In this regard, the entity control path program 80 loaded into the entity processor 50 of each of the node entities 30B–30C is essentially identical, and therefore utilizes the same VPI/VCI for the listening half trail. In particular, the entity control path program 80 configures each node entity 30B–D to utilize $VPI_1/VCI_1$ for the listening half trail. Assuming that the entity processors 50 of the node entities 30 have all begun execution, FIG. 1B shows establishment of the entity-listening half trail for each of the node entities 30B–30D as half trails $HT_{E/L-26B}$ through $HT_{E/L-26D}$, respectively. The half trails $HT_{E/L-26B}$ through $HT_{E/L-26D}$ are realized physically over bidirectional links 32B–32D, respectively. After establishing its entity-listening half trail, at step 4-3 each entity control path program 80 waits for a handshaking request from node main processor 40.

While the establishment of the half trails by the node main processor 40 for a given node entity 30 and establishment of the half trails by the entity processor 50 of that node entity 30 have been discussed and illustrated sequentially with respect to FIG. 1A and FIG. 1B, it should be understood that the actions of step 3-4 and step 4-2 for any node entity 30 can occur in either order, or essentially simultaneously. However, the main control path program 70 and entity control path program 80 for a particular node entity 30 become coordinated through handshaking at step 3-5 and step 4-3, as discussed below.

At step 3-5 main control path program 70 sends a handshaking request on its sending trail half trail $HT_{S-26C}$ to node entity 30C. The handshaking request, depicted by the broken line labeled $HR_{A/C}$ in FIG. 1C, carries a VPI/VCI assignment which node entity 30C is to use as a sending VPI/VCI for communicating with node main processor 40. In particular, for node entity 30C, the handshaking request $H_{RA/C}$ sends the VPI/VCI assignment values of $VPI_3/VCI_3$ to node entity 30C. In addition, the handshaking request $HR_{A/C}$ includes the SAI-address of node main processor 40 on node entity 30A. The SAI address is comprised of the switch port identity and device address on the UTOPIA bus, e.g., bus 30A-2 in FIG. 2A. Thus, in the present example, since entity control path program 80 of node entity 30C has already established its listening channel half trail $HT_{E/L-26C}$ to communicate with half trail $HT_{S-26C}$, at step 3-5 and step 4-2 a complete or full trail $FT_{A/C}$ is established through switch core 24 as shown in FIG. 1C.

Figure 1D:
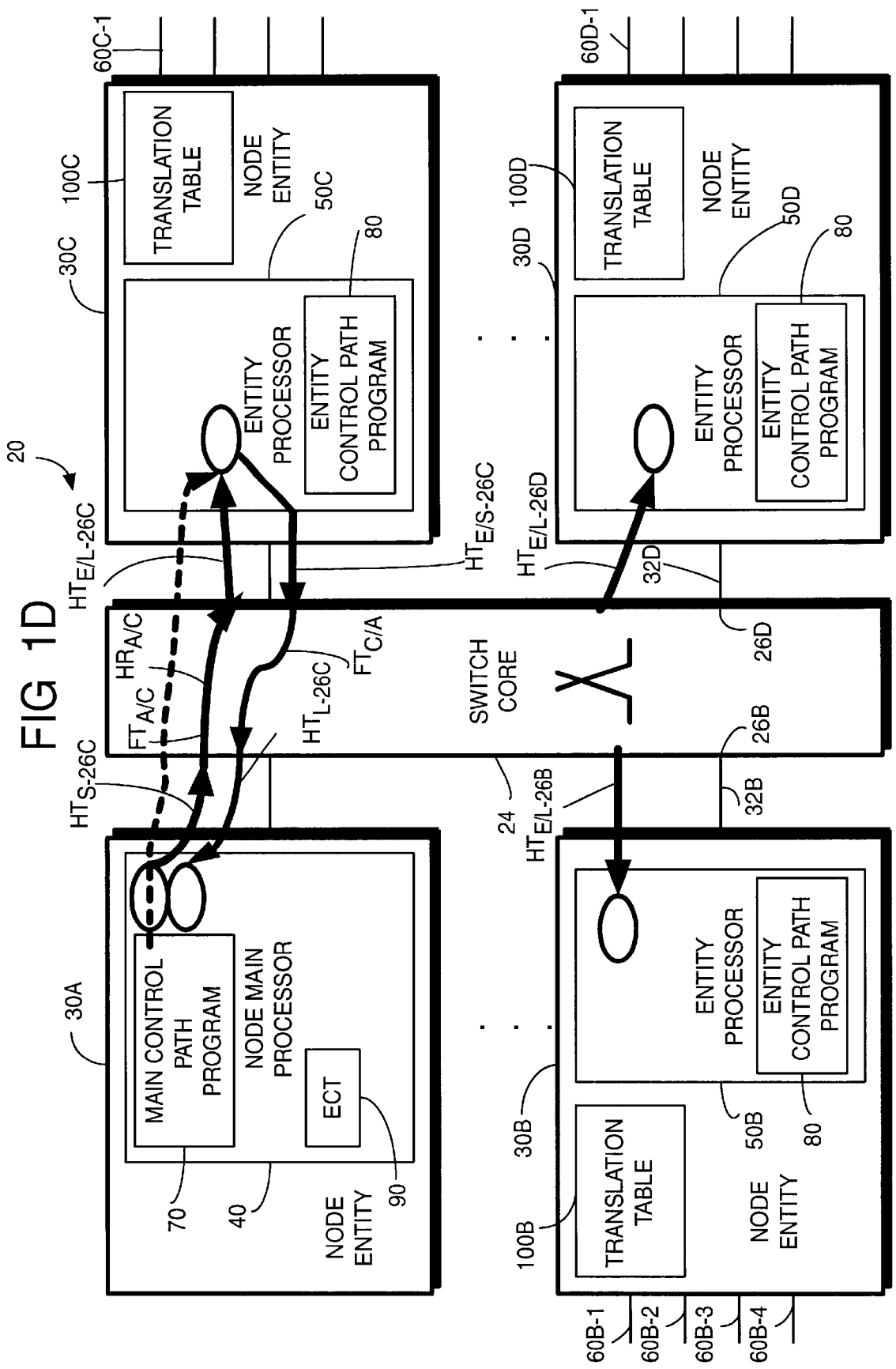

Having awaited the handshaking request (see step 4-3), at step 4-4 the entity control path program 80 of node entity 30C obtains the VPI/VCI assignment values from the handshaking request $HR_{AC}$. Then, as indicated by step 4-5, entity control path program 80 prepares an entity-sending half trail $HF_{E/S-26C}$ using the VPI/VCI value assigned in the handshaking message. In the current example, the VPI/VCI value utilized for the entity-sending half trail $HF_{E/S-26C}$ is $VPI_3/VCI_3$. The creation of entity-sending half trail $HF_{E/S-26C}$ and the existence of listening half trail $HT_{L-26C}$ at node entity 30A results in the formation of a full trail $FT_{C/A}$ as shown in FIG. 1D.

After the loop of step 3-3 through step 3-5 is performed for a processor, a check is made at step 3-6 whether these steps have been executed for all processors of ATM node 20. The actions of step 3-3 through step 3-5 are thus repeated for each of the processors in ATM node 20, e.g,. for entity processor 50B and entity processor 50D, until all processors have been sent a handshaking request as shown in FIG. 1D. Thus, with respect to step 3-4, node main processor 40 establishes sending half trails $HT_{S-26C}$ ($VPI_1$, $VCI_1$,26C) and $HT_{S-26D}$ ($VPI_1$,$VCI_1$,26D) for node entities 30C and 30D, respectively, and establishes listening half trails $HT_{L-26C}$ ($VPI_3$,$VCI_3$,26C) and $HT_{L-26D}$ ($VPI_4$, $VCI_4$,26D) for node entities 30C and 30D, respectively.

A loop comprising step 3-7 through step 3-10 is performed by main control path program 70 for each processor of ATM node 20. At step 3-7, main control path program 70 waits for one of (1) a response from the handshaking request of step 3-5 or (2) a timeout.

After receipt of the handshaking request from node main processor 40 and establishment of its entity-listening half trail, at step 4-6 the entity control path program 80 of the node entity 30 responds to the handshaking request of step 3-5 with a response message. The response message is sent over the assigned VPI/VCI which was transmitted to the node entity 30 in the handshaking request of step 3-5. For example, with respect to node entity 30C a response message (shown by the broken arrow $RM_{C/A}$ in FIG. 1E) is sent over the full trail $FT_{C/A}$ which is formed of entity-sending half trail $HT_{E/S-26C}$ and half trail $HT_{L-26C}$. After issuing its response message, at step 4-7 the entity control path program 80 terminates.

If it is determined at step 3-8 that a response is received rather than a timeout, at step 3-9 the node main processor 40 starts supervision of the link (e.g., full trails) between node main processor 40 and the node entity 30. The same handshaking procedure and execution of step 3-7 through step 3-9 occurs for each processor of ATM node 20 until it is determined at step 3-10 that all processors have been checked. If a timeout occurs for any processor (as detected at step 3-8), the node entity 30 for that processor is noted by node main processor 40 as being absent or nonfunctioning. After all processors of ATM node 20 have been accounted for with an established and supervised link (or otherwise determined to be absent), the main control path program 70 terminates as indicated by step 3-12.

FIG. 1F shows completion of execution of main control path program 70 and entity control path program 80 for each node entity 30 of ATM node 20, with full trails being established between node main processor 40 and the respective entity processors 50 of the respective nodes 30B, 30C, and 30D. In the preceding discussion for sake of illustration the node entity 30C responded first to the handshaking request of node main processor 40, and was followed by responses from other node entities. It should be understood that there may be no particular order for the handshaking responses, and in fact that all node entities 30 may respond to handshaking at approximately the same time.

While the main control path program 70 executed by node main processor 40 has been discussed above using an essentially sequential and simplified flowchart, it should be understood that essentially the same actions of main control path program 70 can be effected in other ways and by differing coding conventions. For example, main control path program 70 can have a separate task or process for each processor in ATM node 20, with the tasks or processes executing in a time sharing or interrupt-driven manner.

In the aforedescribed control path establishment procedure for a node having only one switch core, when creating half trails from node main processor 40 to switch core 24 the main control path program 70 must construct both a listening half trail and a sending half trail. The listening half trail is the VPI/VCI through which the node main processor 40 will listen. For each entity processor 50 of ATM node 20, a separate VPI/VCI is assigned as the listening VPI/VCI from the switch core 24 to node main processor 40. For example, from node entity 30B to node main processor 40 the listening half trail VPI/VCI is $VPI_2/VCI_2$; from node entity 30C to node main processor 40 the listening half trail VPI/VCI is $VPI_3/VCL_3$; and from node entity 30D to node main processor 40 the listening half trail VPI/VCI is $VPI_4/VCI_4$. The value of the VPI/VCI for the listening half trail from switch core 24 to node main processor 40 is a function of to which switch port the half trail listens. The sending trail information is the $VPI_1/VCI_1$ as well as the switch core port 26 to which the cells are to be sent.

The foregoing context of ATM node 20 has illustrated one type of half trail of the present invention, i.e., the core-open half trail which has one end open at switch core 24. Another type of half trail, known herein as an interface-open half trail, occurs (along with the core-open half trail) in an ATM node such as ATM node 120 of the embodiment of FIG. 5.

Figure 5:
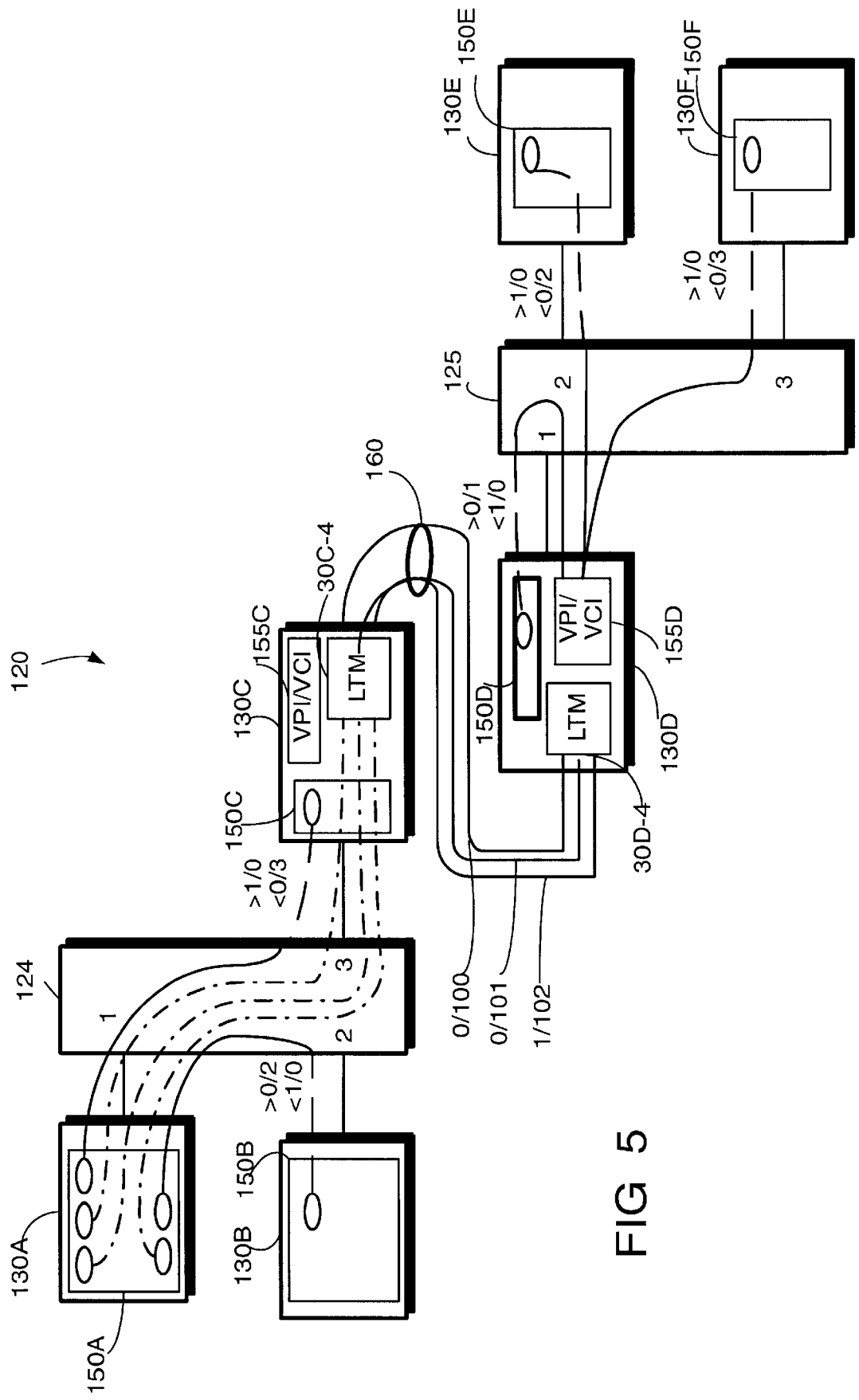
FIG. 5 is a schematic view of a cascaded ATM node according to another embodiment of the invention.

The ATM node 120 of the embodiment of FIG. 5 has plural switch cores, specifically a main switch core 124 and a secondary switch core 125. In the illustration of FIG. 5, main switch core 124 has its switch ports 1–3 utilized for connecting to entities 130A–130C, respectively. The secondary switch core 125 has its switch ports 1–3 utilized for connecting to entities 130D–130F, respectively. The node main processor 140 resides at entity 130A. Each of node entities 130B–130E has an entity processor 150. All entity processors 150, including the entity processors 150D–150F, are supervised by node main processor 140.

The ATM node 120 thus has a two stage or cascaded configuration. The secondary switch core 125 and node entities 130D–130F are housed in a different subrack than the main switch core 124 and node entities 130A–130C, but are collocated at a same node. A main stage of ATM node 120 thus has main switch core 124 as its core; a secondary stage of ATM node 120 has secondary switch core 125 as its core.

The cascaded or multi-staged configuration of ATM node 120 is facilitated by employment of an entity 130 in each stage as an extension terminal for connecting to the other stage. In particular, as shown in FIG. 5, entity 130C of the main stage is connected by physical link 160 to entity 130D of the secondary stage. For sake of simplicity, only the entity processors 150, VPI/VCI translation tables 155, and line termination modules (LTMs) 30C-4 and 30D-4 of the entities 130C and 130D, respectively, are shown in FIG. 5, it being understood that other components of entities 130C and 130D can be as shown in FIG. 2B. Also, as indicated above the VPI/VCI translation tables 155 can be stored, for example, in ATM line modules such as modules 30B-3 shown in FIG. 2B.

The entity processors 150 of the entities 130B–130F of ATM node 120 execute the same entity control path program 80 as described above in connection with ATM node 20. Thus, for each entity 130 a listening half trail is initially set up; a handshaking request is received over the listening half trail for downloading a VPI/VCI for use in a sending channel; and, a response message is sent over the VPI/VCI of the sending channel. For sake of simplicity, the half trails connecting each entity 130 with a switch core are illustrated as one line having one end terminating at the respective entity processor 150, such core-open half trails are illustrated as dashed lines in FIG. 5.

Similarly, the node main processor 140 of ATM node 120 executes essentially the same main control path program 70 as does node main processor 40 of the ATM node 20 of the embodiment of FIG. 1. Such is particularly evident for the entity processors 150B and 150C which reside on entities 130B and 130C, respectively. Also in establishing the control paths for the entity processors 150D–150F, the main control path program 70 executes the same steps shown in FIG. 3. The loop of step 3-3 through step 3-5 of the main control path program 70 of FIG. 3 is executed for each entity processor 150, but in the configuration of ATM node 120 as shown in FIG. 5 the entity configuration table (ECT) 90 has the contents shown in Table 2.

TABLE 2

ENTITY CONFIGURATION TABLE (ECT)

| Processor | Subrack Identity | Switch Core Port Connection |
|---|---|---|
| 150B | 1 | 2 |
| 150C | 1 | 3 |
| 150D | 2 | 3 |
| 150E | 2 | 3 |
| 150F | 2 | 3 |

In referring to the entity configuration table (ECT) 90 at step 3-3 of the main control path program 70 of FIG. 3, the node main processor 140 determines that the processors 150D through 150F are to be reached via the extension terminal formed by entity 130C. In this regard, the subrack identification in the second column of Table 2 apprises node main processor 140 that the processors are located at the second stage of ATM node 120.

Upon noting the entity processors 150D through 150F are in the second stage of ATM node 120, for each such entity processor 150 the node main processor 140 prepares both listening and sending half trails in the first stage, as shown by dotted-dashed lines. These half trails, i.e., the interface-open half trails mentioned above, have their terminations at the node main processor 140 and another end open at a link that connects the main switch stage (or module) with a secondary switch stage (or module). For simplicity, the interface-open half trails are shown as one line in FIG. 5 rather than two separate half trails. Further, both the listening and sending interface-open half trails are illustrated as passing through a line termination module, specifically line termination module 130C-4 of entity 130C. These interface-open half trails are set up by node main processor 40 in anticipating of forming full trails to the entity processors 150D through 150F. The remainder of the full trail is formed by the corresponding core-open half trail which leads to the respective one of the entity processors 150D–150F and the translations of table 155D.

In forming the interface-open half trails in the cascaded ATM node, the node main processor 140 includes in the handshake request (see step 3-5) an SAI-address which identifies the traffic device on the inlet node entity 130, e.g., node entity 130D, rather than the address of the node main processor 140 on node entity 130A as in the single stage embodiment of FIG. 1. This SAI-address of the traffic device is included in the handshaking request along with the VPI/VCI which is to be used for sending from the node entity 130 which executes the entity control path program 80.

In the depiction of FIG. 5, the entity control path program 80 which is loaded into each entity processor 150 assigns its listening half trail the VPI/VCI value of $VPI_1/VCI_0$. In FIG. 5, such VPI/VCI notation is shown as 1/0. The three control paths transmitted on bidirectional physical link 160 are assigned the VPI/VCIs of 0/100; 0/101; and 0/120.

The entities 130C and 130D which serve to bridge the two stages of the ATM node 120 of FIG. 5 have VPI/VCI translation tables 155C and 155D, respectively, which are set up in order to facilitate the cascading structure of the node. An example VPI/VCI translation table 155D for entity 130D is shown in FIG. 6. The VPI/VCI translation table 155D is partition into two sections: a first section for an ingress direction (for cells traveling from the first stage to the second stage) and a second section for an egress direction (for cells traveling from the second stage to the first stage).

The VPI/VCI translation tables are setup by software stored in ROM in each extension terminal (ET) entity. Thus, it is only on those extension terminals that serve as inlets, i.e., 130D in FIG. 5, that such is utilized. Translations set up on outlet terminals will be overwritten when establishing the half trails originating in node main processor 150A. Since all extension terminals have the same pre-setup translations aimed to connect the half trails in order to establish internal control paths, the VPI/VCI utilized for these internal control paths are not possible to use for normal ATM connections on other physical links.

The cells having VPI/VCI 0/100 on link 160 are ultimately destined for entity processor 150D. At VPI/VCI translation table 155D, the VPI/VCI value of 0/100 in the external cell header is translated to 1/0 and an SAI-address of (1,0) is assigned. The SAI-address is comprised of the switch port identity and device address on the UTOPIA bus (see FIG. 2A and FIG. 2B) [the processor always having the address 0 on the UTOPIA bus]). Thus, the internal cell header for such cell as VPI/VCI of 1/0 and a switch port address of 1. As shown in FIG. 5, such cell is routed to VPI/VCI translation tables 155D of entity 130D, since switch port 1 connects to entity 130D and VPI/VCI 1/0 is the VPI/VCI which leads to entity processor 150D. In similar fashion, the external VPI/VCI of 0/101 in a cell header is translated to an internal VPI/VCI of 1/0 and an SAI-address of (2,0) for reaching entity processor 150E of 130E, and the external VPI/VCI of 0/102 in a cell header is translated to an internal VPI/VCI of 1/0 and an SAI-address of (3,0) for reaching entity processor 150F of 130F.

As shown in the egress partition of the VPI/VCI Table of FIG. 6, cells emanating from processor 150D have the internal VPI/VCI of 1/0. At the translation table 155D of FIG. 6 a translation is made for the outgoing physical link, specifically to an external VPI/VCI of 0/100. Similarly, cells emanating from entity processor 150E have a VPI/VCI of 0/2, which is translated to an external VPI/VCI of 0/101 at translation table 155D. Likewise, cells emanating from entity processor 150F have a VPI/VCI of 0/3, which is translated to an external VPI/VCI of 0/102 at translation table 155D.

Thus, an internal control path for the multi-staged ATM node 120 of FIG. 5 has three primary parts: an interface-terminated half trail from node main processor 140 to link 160; the VPI/VCI translations at VPI/VCI translation table 155D, and the core-terminated half trail between switch core 125 and the entity processor 150 involved in the internal control path.

It so happens that translation table 155C of entity 130C also receives the same content as translation table 155D during a read only memory (ROM) start up phase. However, translation table 155C is later overwritten using conventional establishing algorithms.

The normal setting up of translation tables such as translation table 155D is accomplished by cooperation of processors 140 and 150D. The manner of setting up translation tables for use in an ATM switching node is readily understood by the person skilled in the art. Moreover, it so happens that translation table 155C of entity 130C also receives the same content as translation table 155D during the start up phase. However, translation table 155C is later overwritten using conventional establishing algorithms.

In the illustrated embodiment, the extension modules such as node entities 130C and 130D each have sixteen VPI/VCIs on the physical link reserved for internal control paths. These sixteen reserved VPI/VCIs are unavailable for use by other connections, irrespective of whether a physical link corresponding to the control path VPI/VCI actually exists or not.

In the examples hereindescribed, the half trails are preferably AAL5 half trails. When creating an interface-open half trail, an operator supplies the identity of the ATM interface (e.g., line termination module) to which the link is connected that is intended to be used for internal control path. When creating an interface-open half trail in a first stage of a multi-staged node, a core-open half trail must exist in the second stage in order to form a complete or full trail.

In accordance with the present invention, if two processor which are communicating over an internal control path lose contact with one another, the internal control path is regarded as broken. However, since the infrastructure may still be usable, the control system can start handshaking again (see step 3-5) in order to attempt to re-establish the broken internal control path. If the infrastructure (or part of it fails), the control system will be notified and the internal control path fails. The control system then again requests that the lost infrastructure part (e.g., the half trails) be re-established and will also order handshaking in order to re-establish the broken internal control path.

The nodes of the present invention can also have peripheral processors situated on one more of the node entities. Internal control paths between peripheral processors and entity processors which serve as the board processors are established as AAL5 trails when execution of application programs is begun on two involved processors. The node control system reads the configuration for each peripheral processor to determine with what other processors the peripheral processor will communicate. The control system then issues ATM bearer transport orders to establish the internal control paths.

The ATM bearer transport employs its normal connection establishing mechanisms in order to create the requested internal control paths.

Although the term "switch port" has been employed herein, the person skilled in the art will recognized that it is actually the triplet (switch port, UTOPIA device address), i.e., the SAI address that is the correct term. However, since the UTOPIA device address is constant (e.g., zero) in all cases except the multistage configuration, the term switch port has been utilized herein. The broader concept is relevant (e.g., with another UTOPIA address) when transferring the sending information from the main processor to the node entity processor of another switch module with the handshake request.

While all node entities 30 (except the node entity 30 at which node main processor 40 is located) have been shown in the foregoing examples to be extension terminals, it should be understood that the node entities 30 can, and often do, serve other functions additionally or alternatively. In this regard, the invention can be employed with ATM nodes which are employed in telecommunications, e.g., in cellular telephone communications. In the instance of an ATM node 20 being a base station for a cellular telecommunications network, one or more of the node entities 30 can be a transmitter/receiver for example. Examples of telecommunications networks which employ ATM nodes been cited above, and additionally include U.S. Pat. No. 6,233,222 for "Telecommunications Inter-Exchange Congestion Control," U.S. patent application Ser. No. 09/035,821 for "Telecommunications Inter-Exchange Measurement Transfer", all of which are incorporated herein by reference.

It should be understood that the foregoing embodiments are merely exemplary and do not confine application of the present invention to any particular structure. For example, while preferably the number of node entities connected to a switch core ranges from 0 to 14 in the illustrated embodiment, such number is not critical.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of establishing internal control paths within an Asynchronous Transfer Mode (ATM) node, the node having a switch core and plural entities which communicate via the switch core, the switch core having plural ports, one of the plural entities having a node main processor and each of the plural entities having an entity processor, the method comprising:

(1) loading each of the entity processors with an executable program, the executable program for each of the entity processors specifying a same VPI/VCI to be used for cells to be sent to the entity processors from the node main processor;

(2) providing the same VPI/VCI to the node main processor without previously communicating the same VPI/VCI to the main processor from the entity processors; and (3) connecting each of the plural entities to a respective one of the plural ports of the switch core.

2. The method of claim 1, further comprising obtaining on the designated VPI/VCI, at each of the plural entities, information designating a VPI/VCI to be used in cells to be sent from the respective entity to the node main processor.

3. The method of claim 2, further comprising obtaining on the designated VPI/VCI, at each of the plural entities, information regarding an address of the node main processor to be used by the entity for sending cells to the node main processor.

4. The method of claim 2, wherein the switch core is a first stage switch core, wherein the node includes a second stage including a second stage switch core to which plural second stage entities are connected, one of the second stage entities being serving as an extension terminal for connecting to an entity of the first stage, and wherein the method further comprises obtaining on the designated VPI/VCI, at an entity of the second stage, information regarding an address of a traffic device at the extension terminal to be used by the entity for sending cells to the node main processor.

5. The method of claim 1, wherein as loaded into the entity processors of each of the plural entities, the executable program has uniform steps for establishing control paths for each of the plural entities.

6. The method of claim 1, further comprising performing step (1) prior to step (3).

7. The method of claim 1, further comprising using at least one of the plural entities as an extension terminal, the extension terminal being connected by a physical line to another node.

8. An Asynchronous Transfer Mode (ATM) node comprising:

a switch core having plural ports;

plural entities which communicate via the switch core;

a node main processor provided at one of the plural entities;

respective entity processors provided at each of the plural entities, the entity processors each performing an executable program, the executable program for each of the entity processors specifying a same VPI/VCI to be used for cells to be sent to the entity processors from the node main processor; and wherein the same VPI/VCI is provided to the node main processor without communicating the same VPI/VCI to the main processor from the entity processors.

9. The apparatus of claim 8, wherein each of the plural entities obtain, on the specified VPI/VCI, information designating a VPI/VCI to be used in cells to be sent from the respective entity to the node main processor.

10. The apparatus of claim 9, wherein each of the plural entities obtain, on the specified VPI/VCI, information regarding an address of the node main processor to be used by the plural entities for sending cells to the node main processor.

11. The apparatus of claim 9, wherein the switch core is a first stage switch core, wherein the node further comprises a second stage including a second stage switch core to which plural second stage entities are connected, one of the second stage entities being serving as an extension terminal for connecting to an entity of the first stage, and wherein one of the second stage entities obtains on the specified VPI/VCI information regarding an address of a traffic device at the extension terminal to be used by the entity for sending cells to the node main processor.

12. The apparatus of claim 8, wherein as loaded into the entity processors of each of the plural entities, the executable program has uniform steps for establishing control paths for each of the plural entities.

13. The apparatus of claim 8, wherein at least one of the plural entities serves as an extension terminal, the extension terminal being connected by a physical line to another node.

14. A method of establishing internal control paths within an Asynchronous Transfer Mode (ATM) node, the node having a switch core and plural entities which communicate via the switch core, the switch core having plural ports, one of the plural entities having a node main processor, the method comprising:

(1) prior to communicating with the node main processor, at at least one of the entities designating a VPI/VCI to be used for cells to be sent to the at least one of the entities from the node main processor;

(2) providing the same VPI/VCI to the node main processor without previously communicating the same VPI/VCI to the main processor from the entity processors; and (3) connecting the at least one of the plural entities to a respective one of the plural ports of the switch core.

15. The method of claim 14, further comprising obtaining on the designated VPI/VCI, from the node main processor, information designating a VPI/VCI to be used in cells to be sent from the respective entity to the node main processor.

16. The method of claim 14, further comprising obtaining on the designated VPI/VCI, from the node main processor, information regarding an address of the node main processor to be used by the entity for sending cells to the node main processor.

17. The method of claim 14, wherein the switch core is a first stage switch core, wherein the node includes a second stage including a second stage switch core to which plural second stage entities are connected, one of the second stage entities being serving as an extension terminal for connecting to an entity of the first stage, and wherein the method further comprises obtaining on the designated VPI/VCI, at an entity of the second stage, information regarding an address of a traffic device at the extension terminal to be used by the entity for sending cells to the node main processor.

18. The method of claim 14, wherein each of the plural entities has an entity processor, and wherein the method further comprises loading into the entity processors of each of the plural entities an executable program which has uniform steps for designating a same VPI/VCI to be used for cells to be sent to a respective entity processor from the node main processor.

19. The method of claim 14, further comprising performing step (1) prior to step (3).

20. The method of claim 14, further comprising using at least one of the plural entities as an extension terminal, the extension terminal being connected by a physical line to another node.

21. An Asynchronous Transfer Mode (ATM) node comprising:
- a switch core having plural ports;
- plural entities which communicate via the switch core, one of the plural entities having a node main processor;
- wherein at least one of the entities is preconfigured prior to communicating with the node main processor to designate a VPI/VCI to be used for cells to be sent to the plural entities from the node main processor
- wherein the same VPI/VCI is provided to the node main processor without previously communicating the same VPI/VCI to the main processor from the plural entities; and
- wherein the main processors uses the designated VPI/VCI and a switch core port to send a cell to one of the plural entities.

22. The apparatus of claim 21, wherein the at least one of the entities obtains, on the designated VPI/VCI from the node main processor, information designating a VPI/VCI to be used in cells to be sent from the respective entity to the node main processor.

23. The apparatus of claim 21, wherein at least one of the plural entities obtains, on the designated VPI/VCI, information regarding an address of the node main processor to be used by the plural entities for sending cells to the node main processor.

24. The apparatus of claim 21, wherein the switch core is a first stage switch core, wherein the node further comprises a second stage including a second stage switch core to which plural second stage entities are connected, one of the second stage entities being serving as an extension terminal for connecting to an entity of the first stage, and wherein one of the second stage entities obtains on the designated VPI/VCI information regarding an address of a traffic device at the extension terminal to be used by the entity for sending cells to the node main processor.

25. The apparatus of claim 21, herein each of the plural entities has an entity processor, and wherein each of the plural entities has an entity processor which is loaded with an executable program which has uniform steps for designating a same VPI/VCI to be used for cells to be sent to a respective entity processor from the node main processor.

26. The apparatus of claim 21, wherein at least one of the plural entities serves as an extension terminal, the extension terminal being connected by a physical line to another node.

27. A method of establishing internal control paths within an Asynchronous Transfer Mode (ATM) node, the node having a switch core and plural entities which communicate via the switch core, the switch core having plural ports, one of the plural entities having a node main processor, the method comprising:
- establishing respective plural half trails for sending cells from the node main processor to the plural entities, each of the plural half trails having a same VPI/VCI from the node main processor toward the switch core; and
- connecting each of the plural entities to a respective one of the plural ports of the switch core.

28. The method of claim 27, further comprising:
- prior to communicating with the node main processor, at each of the plural entities specifying a same predetermined VPI/VCI from the switch core to the entity for obtaining cells from the node main processor.

29. The method of claim 27, further comprising:
- sending from the node main processor to each of the plural entities over the respective plural half trails information designating a unique sending VPI/VCI to be used by the entity for sending cells to the node main processor.

30. The method of claim 29, further comprising:
- sending from the node main processor to each of the plural entities over the respective plural half trails information regarding an address of the node main processor to be used by the plural entities for sending cells to the node main processor.

31. The method of claim 29, wherein the switch core is a first stage switch core, wherein the node further comprises a second stage including a second stage switch core to which plural second stage entities are connected, one of the second stage entities being serving as an extension terminal for connecting to an entity of the first stage, and wherein one of the second stage entities obtains on the predetermined VPI/VCI information regarding an address of a traffic device at the extension terminal to be used by the entity for sending cells to the node main processor.

32. The method of claim 27, further comprising performing the establishing step prior to the connecting step.

33. The method of claim 27, further comprising using at least one of the plural entities as an extension terminal, the extension terminal being connected by a physical line to another node.

34. An Asynchronous Transfer Mode (ATM) node comprising:
- a switch core having plural ports;
- plural entities connected to corresponding ones of the plural ports;
- a node main processor provided at one of the plural entities which establishes respective plural half trails for sending cells from the node main processor to the plural entities, each of the plural half trails having a same VPI/VCI from the node main processor toward the switch core.

35. The apparatus of claim 34, wherein each of the plural entities is preconfigured, prior to communicating with the node main processor, to specify a same VPI/VCI from the switch core to the entity for obtaining cells from the node main processor.

36. The apparatus of claim 34, wherein the node main processor sends to each of the plural entities over the respective plural half trails information designating a unique sending VPI/VCI to be used by the entity for sending cells to the node main processor.

37. The apparatus of claim 36, wherein the node main processor sends to each of the plural entities over the respective plural half trails information regarding an address of the node main processor to be used by the plural entities for sending cells to the node main processor.

38. The apparatus of claim 36, wherein the switch core is a first stage switch core, wherein the node further comprises a second stage including a second stage switch core to which plural second stage entities are connected, one of the second stage entities being serving as an extension terminal for connecting to an entity of the first stage, and wherein one of the second stage entities obtains on the VPI/VCI information regarding an address of a traffic device at the extension terminal to be used by the entity for sending cells to the node main processor.

39. The apparatus of claim 34, wherein at least one of the plural entities serves as an extension terminal, the extension terminal being connected by a physical line to another node.

40. A method of establishing internal control paths within an Asynchronous Transfer Mode (ATM) node, the node having a switch core and plural entities which communicate via the switch core, the switch core having plural ports, one of the plural entities having a node main processor and each of the plural entities having an entity processor, the method comprising:

loading each of the entity processors with an executable program, the executable program for each of the entity processors specifying a same VPI/VCI to be used for cells to be sent to the entity processors from the node main processor;

connecting each of the plural entities to a respective one of the plural ports of the switch core; and, using at least one of the plural entities as an extension terminal, the extension terminal being connected by a physical line to another node.

41. An Asynchronous Transfer Mode (ATM) node comprising:

a switch core having plural ports;

plural entities which communicate via the switch core;

a node main processor provided at one of the plural entities;

respective entity processors provided at each of the plural entities, the entity processors each performing an executable program, the executable program for each of the entity processors specifying a same VPI/VCI to be used for cells to be sent to the entity processors from the node main processor; and wherein at least one of the plural entities serves as an extension terminal, the extension terminal being connected by a physical line to another node.

42. A method of establishing internal control paths within an Asynchronous Transfer Mode (ATM) node, the node having a switch core and plural entities which communicate via the switch core, the switch core having plural ports, one of the plural entities having a node main processor, the method comprising:

prior to communicating with the node main processor, at at least one of the entities designating a VPI/VCI to be used for cells to be sent to the at least one of the entities from the node main processor;

connecting the at least one of the plural entities to a respective one of the plural ports of the switch core;

using at least one of the plural entities as an extension terminal, the extension terminal being connected by a physical line to another node.

43. An Asynchronous Transfer Mode (ATM) node comprising:

a switch core having plural ports;

plural entities which communicate via the switch core, one of the plural entities having a node main processor;

wherein at least one of the entities is preconfigured prior to communicating with the node main processor to designate a VPI/VCI to be used for cells to be sent to the plural entities from the node main processor;

wherein at least one of the plural entities serves as an extension terminal, the extension terminal being connected by a physical line to another node.

44. A method of establishing internal control paths within an Asynchronous Transfer Mode (ATM) node, the node having a switch core and plural entities which communicate via the switch core, the switch core having plural ports, one of the plural entities having a node main processor, the method comprising:

establishing respective plural half trails for sending cells from the node main processor to the plural entities, each of the plural half trails having a same VPI/VCI from the node main processor toward the switch core;

connecting each of the plural entities to a respective one of the plural ports of the switch core; and using at least one of the plural entities as an extension terminal, the extension terminal being connected by a physical line to another node.

45. An Asynchronous Transfer Mode (ATM) node comprising:

a switch core having plural ports;

plural entities connected to corresponding ones of the plural ports;

a node main processor provided at one of the plural entities which establishes respective plural half trails for sending cells from the node main processor to the plural entities, each of the plural half trails having a same VPI/VCI from the node main processor toward the switch core;

wherein at least one of the plural entities serves as an extension terminal, the extension terminal being connected by a physical line to another node.

\* \* \* \* \*